(12) United States Patent
Sawada

(10) Patent No.: US 6,364,436 B1
(45) Date of Patent: Apr. 2, 2002

(54) BRAKE CONTROL DEVICE

(75) Inventor: Mamoru Sawada, Yokkaichi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/713,019

(22) Filed: Nov. 16, 2000

(30) Foreign Application Priority Data

Nov. 19, 1999 (JP) ............................................ 11-329815

(51) Int. Cl.[7] ............................ B60T 8/00; B60T 13/66; B60T 7/12
(52) U.S. Cl. ................................. 303/191; 188/DIG. 2; 188/353; 303/162; 303/116.1; 303/166; 303/DIG. 3; 303/DIG. 4; 303/199
(58) Field of Search .............................. 303/116.1, 166, 303/167, DIG. 3, DIG. 4, 113.1, 113.4, 155, 3, 10–11, 119.1, 116.2, 199, 89, 191, 162; 701/70; 188/353, DIG. 2

(56) References Cited

U.S. PATENT DOCUMENTS 5,052,531 A    10/1991  Bota
5,484,044 A  * 1/1996   Bursteinas et al. .......... 188/353
5,979,619 A  * 11/1999  Rump ........................ 303/191

FOREIGN PATENT DOCUMENTS

| EP | 0 895 914 A | 2/1999 |
| EP | 0 895 915 A | 2/1999 |
| JP | 63-195052 | 8/1988 |
| JP | 7-125617 | 5/1995 |
| JP | 9-58428 | 3/1997 |
| JP | 10-250541 | 9/1998 |
| JP | 11-124018 | 5/1999 |

* cited by examiner

Primary Examiner—Douglas C. Butler
(74) Attorney, Agent, or Firm—Law Offices of David G. Posz

(57) ABSTRACT

A brake control device has a master cylinder, wheel cylinder, and a solenoid valve disposed in a conduit between the master cylinder and the wheel cylinder. When a brake pedal happens to be returned at sudden braking, at an idle stop or at vehicle stop on a sloping road, the solenoid valve is controlled at a duty rate based on a difference between a peak value of master cylinder and an actual value of master cylinder reducing so that wheel cylinder pressure is held to a value higher than master cylinder pressure.

15 Claims, 11 Drawing Sheets

BRAKE CONTROL DEVICE

CROSS REFERENCE TO RELATED APPLICATION

This application is based upon and claims the benefit of priority of Japanese Patent Application No. H.11-329815 filed on Nov. 19, 1999, the content of which is incorporated herein by reference.

BACKGROUND OF THE INVENTION

1. Field of the Invention

The present invention relates to a brake control device in which brake control can be automatically executed according to a demand based on vehicle behavior in addition to a demand based on a driver's brake pedal operation.

2. Description of Related Art

Conventionally, a braking control for stabilizing vehicle behavior such as anti-skid control is well known. In the anti-skid control, when a brake pedal is depressed for braking, each vehicle wheel speed is controlled by adjusting braking hydraulic pressure of each wheel cylinder so that a slip ratio of each wheel may fall within a given range in order to obtain optimum braking force in each wheel.

To execute the anti-skid control, as shown in FIG. 15, a hydraulic circuit of a brake control device is provided with electromagnetic valves such as a pressure reduce control valve P1 and a pressure increase control valve P2 for reducing hydraulic pressure of the wheel cylinder or for holding hydraulic pressure of the wheel cylinder.

The pressure increase control valve P2 is a normally open valve (N/O valve) in which a fluid conduit is normally opened by a spring biasing force and the fluid conduit is closed when a solenoid is energized. The pressure reduce control valve P1 is a normally closed valve (N/C valve) in which a fluid conduit is normally closed by a spring biasing force and the fluid conduit is opened when a solenoid is energized. The pressure increase control valve P2 is operative to close a fluid conduit from a master cylinder P3 to a wheel cylinder P4 for holding the wheel cylinder hydraulic pressure when the pressure reducing valve P1 is closed and for reducing the wheel cylinder hydraulic pressure when the pressure reducing valve P1 is opened.

The hydraulic circuit is also provided with a check valve P5 (return valve) in parallel to the pressure increase control valve P2 (other check valves are omitted in the drawing). When wheel cylinder pressure is higher than master cylinder pressure, brake fluid returns from a master cylinder side to a wheel cylinder side. In a case that the vehicle is running on a high $\mu$ road such as asphalt road and a driver depresses suddenly and rapidly a brake pedal, the driver, who is a woman or elder person, is likely to return the brake pedal to reduce master cylinder pressure due to a reaction force of the brake pedal after the master cylinder establishes maximum pressure. When a brake pedal P6 is returned to reduce master cylinder pressure, the check valve P5 serves to return the brake fluid back from a side of the wheel cylinder P4 to a side of the master cylinder P3 so that wheel cylinder pressure may be reduced to lower the braking force, resulting in a longer braking distance.

In a special case where it is demanded that wheel cylinder pressure (braking force) is held even if the driver's brake pedal depressing force is released due to a reaction force of the brake pedal or other reasons, the conventional hydraulic circuit having the returned valve mentioned above cannot work adequately.

Keeping a step with a recent tendency of developing a compact car having a light weight structure, it is demanded that the hydraulic circuit of the brake control device is more compact with a less number of brake components and parts but operative with better braking force holding function.

SUMMARY OF THE INVENTION

An object of the present invention is to provide a brake control device having a compact structure with a less number of brake components and parts for executing braking force holding control.

To achieve the object, the brake control device has brake pressure producing means (for example, master cylinder) for producing hydraulic pressure (for example, master cylinder pressure) according to a braking operation of a vehicle driver, wheel braking force generating means (for example, wheel cylinder) for generating braking force to a wheel, a fluid conduit connecting the brake pressure producing means and the wheel braking force generating means for allowing brake fluid flow between the brake pressure producing means and the wheel braking force generating means, a solenoid valve (for example, pressure increase control valve) disposed in the fluid conduit so that the fluid conduit may be provided on a side of the brake pressure producing means with a first hydraulic pressure and on a side of the braking force generating means with a second hydraulic pressure, an electric control unit, and sensor means including a pressure sensor for generating sensor signals representing vehicle states including a value of the first hydraulic pressure, all of which are input to the electric control unit.

The electric control unit has memory means for receiving the sensor signal of the pressure sensor and memorizing a peak value of the first hydraulic pressure, determining means for determining from the sensor signals a necessity of a braking force holding control for holding the second hydraulic pressure higher than the first hydraulic pressure when the brake pedal happens to be returned and generating a demand signal for executing the braking force holding control, calculating means for calculating a control amount based on a difference between the peak value of the first hydraulic pressure and an actual value of the first hydraulic pressure to be lowered when the brake pedal is returned, and driving means for driving the solenoid valve so as to restrict brake fluid flow from the braking force generating means to the brake pressure producing means in response to the control amount, when the demand signal is generated, wherein, while an increasing speed of the second hydraulic pressure is substantially equal to that of the first hydraulic pressure when the brake pedal is depressed, a reducing speed of the second hydraulic pressure is lower that that of the first hydraulic pressure during a given time when the brake pedal happens to be returned.

In the brake control device mentioned above, it is preferable to have an anti-skid control circuit provided with a hydraulic pump connected with the fluid conduit for the first hydraulic pressure and a pressure reduce control valve connected with the fluid conduit for the second hydraulic pressure in addition to the pressure increase control valve.

The braking force holding control is executed when the determining means generates the demand signal by determining based on the sensor signals that the driver depresses rapidly the brake pedal for sudden braking, for example, by determining that a change per time of the brake pedal movement exceeds a predetermined value.

Further, it is preferable that the braking force holding control is executed when the determining means generates the demand signal by determining that the vehicle stops on a sloping road due to the driver's brake pedal operation or that an engine of the vehicle stops as an idle stop due to the driver's brake pedal operation.

The sensor signals to be used for determining that the vehicle stops on the sloping road are, for example, signals from a sloping sensor for detecting an inclination angle of the vehicle stopping on the sloping road (the angle is more than a predetermined value), from a brake switch (ON) for detecting the driver's brake pedal depression and from a speed sensor for detecting at least one of a vehicle speed and a wheel speed (zero speed).

Further, the sensor signals to be used for determining that the engine of the vehicle stops as an idle stop are, for example, signals from a sensor for detecting an engine stop (signal of fuel cut or signal of ignition stop), from a brake switch (ON) for detecting the driver's brake pedal depression and from a speed sensor for detecting at least one of a vehicle speed and a wheel speed (zero speed).

Furthermore, the solenoid valve is, preferably, a two-position valve driven by the driving means so that current voltage applied thereto is controlled at a duty ratio in proportion to the control amount or a linear solenoid valve driven by the driving means so that a current amount applied thereto is controlled according to the control amount.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS (First embodiment)

Figure 1:
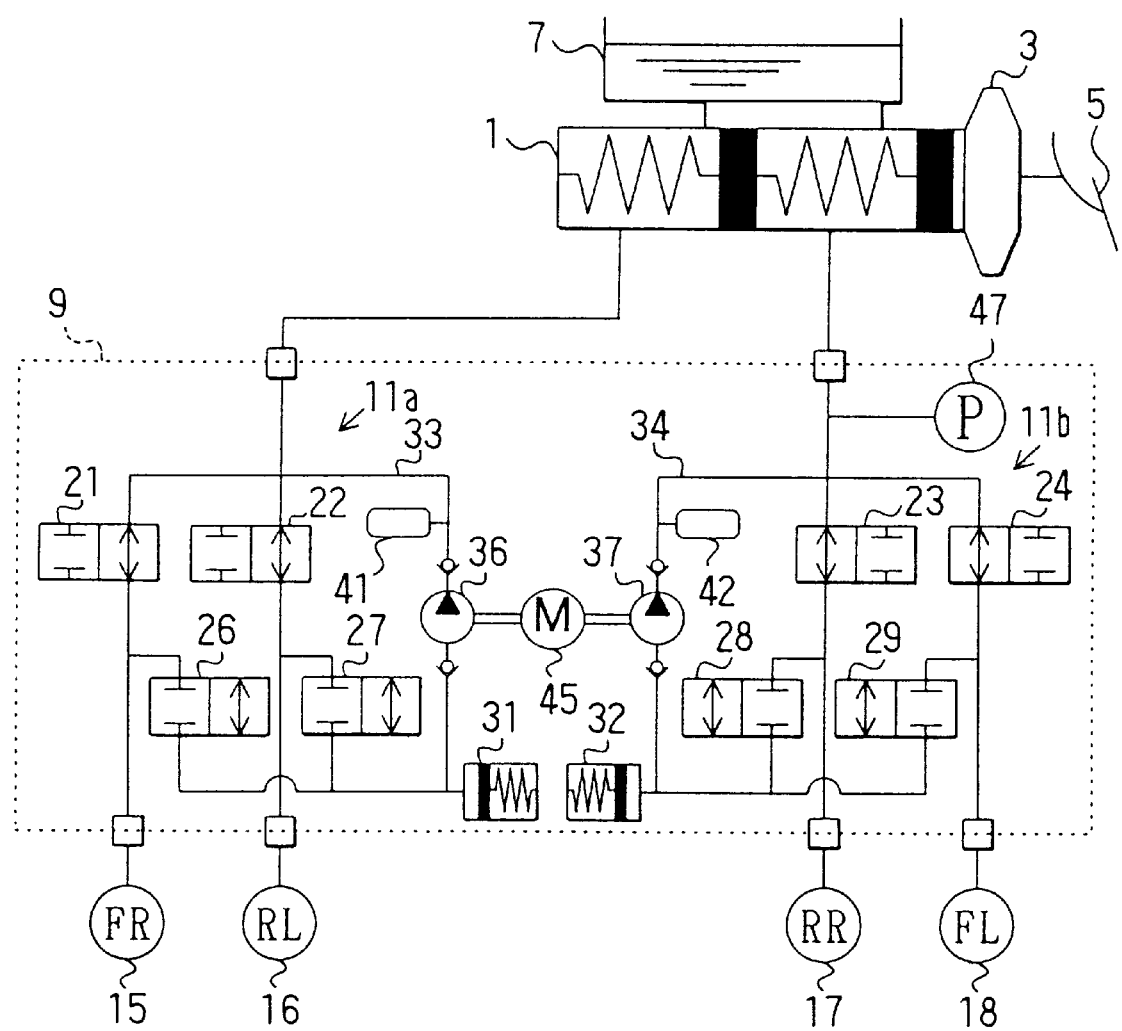
FIG. 1 is a view showing an outline of a brake control device according to a first embodiment of the present invention.

A brake control device according to a first embodiment of the present invention includes a hydraulic circuit for executing braking force holding control and braking force termination control in addition to a known anti-skid control and a brake assist control. FIG. 1 shows an outline structure of the brake control device according to the first embodiment. In the brake control device, as shown in FIG. 1, a brake pedal 5 is connected via a brake booster 3 to a tandem type master cylinder 1 and a master reservoir 7 is also connected with the master cylinder 1.

A hydraulic circuit 9 constituting a two line diagonal piping system for adjusting brake pressure is connected with the master cylinder 1. The hydraulic circuit 9 has a first hydraulic conduit 11a and a second hydraulic conduit 11b.

The master cylinder 1 is connected, via the first hydraulic conduit 11a to a wheel cylinder 15 of a front right wheel (FR) and a wheel cylinder 16 of a rear left wheel (RL) and, via the second hydraulic conduit 11b, to a wheel cylinder 17 of a rear right wheel (RR) and a wheel cylinder 18 of a front left wheel (FL).

The first hydraulic conduit 11a is provided with a pressure increase control valve 21 and a pressure reduce control valve 26 for controlling hydraulic pressure in the FR wheel cylinder 15 and a pressure increase control valve 22 and a pressure reduce control valve 27 for controlling hydraulic pressure in the RL wheel cylinder 16. The second hydraulic conduit 11b is provided with a pressure increase control valve 23 and a pressure reduce control valve 28 for controlling hydraulic pressure in the RR wheel cylinder 17 and a pressure increase control valve 24 and a pressure reduce control valve 29 for controlling hydraulic pressure in the FL wheel cylinder 18.

Each of the pressure increase control valves 21 to 24 is a normally open electromagnetic valve (holding valve) having two positions for opening and closing. Since the pressure reduce control valve is a normally close valve, each of the pressure increase control valves 21 to 24 is operative to open the hydraulic conduit due to a spring biasing force and to close the hydraulic conduit so as to hold wheel cylinder pressure due to a magnetic force when a solenoid is energized.

The first hydraulic conduit 11a is further provided with a reservoir 31 for temporarily storing brake fluid ejected from the pressure reduce control valves 26 and 27 and a hydraulic pump 36 for delivering pressure brake fluid to a conduit 33. The conduit 33 is provided with an accumulator 41 for easing an inherent hydraulic pressure pulsation of brake fluid to be delivered from the pump 36.

With respect to the second hydraulic conduit 11b, the pressure increase control valves 23 and 24, the pressure reduce control valves 28 and 29, a reservoir 32, a hydraulic pump 37 and an accumulator 42 are arranged at positions similar to those of the first hydraulic conduit 11a. The hydraulic pumps 36 and 37 are connected to and driven by an electric pump motor 45.

According to the first embodiment, there are no check valves (return valves) to be positioned in parallel to the pressure increase control valves 21 to 24, as shown in the conventional brake control device. Therefore, as described later in detail, according to a returning operation of the brake pedal 5, wheel cylinder pressure are released by adjusting opening and closing states of the respective pressure increase control valves 21 to 24 not by bypassing brake fluid of the wheel cylinders through the respective return valves.

A pressure sensor 47 for detecting master cylinder pressure is installed in a conduit 34 extending from the master cylinder 1 to the pressure increase control valves 23 and 24 in the second hydraulic conduit 11b. The pressure sensor 47 may be installed in the first hydraulic conduit 11a instead of installing in the second hydraulic conduit 11b, since the master cylinder pressure is identical in each of the first and second hydraulic conduits 11a and 11b.

Figure 2:
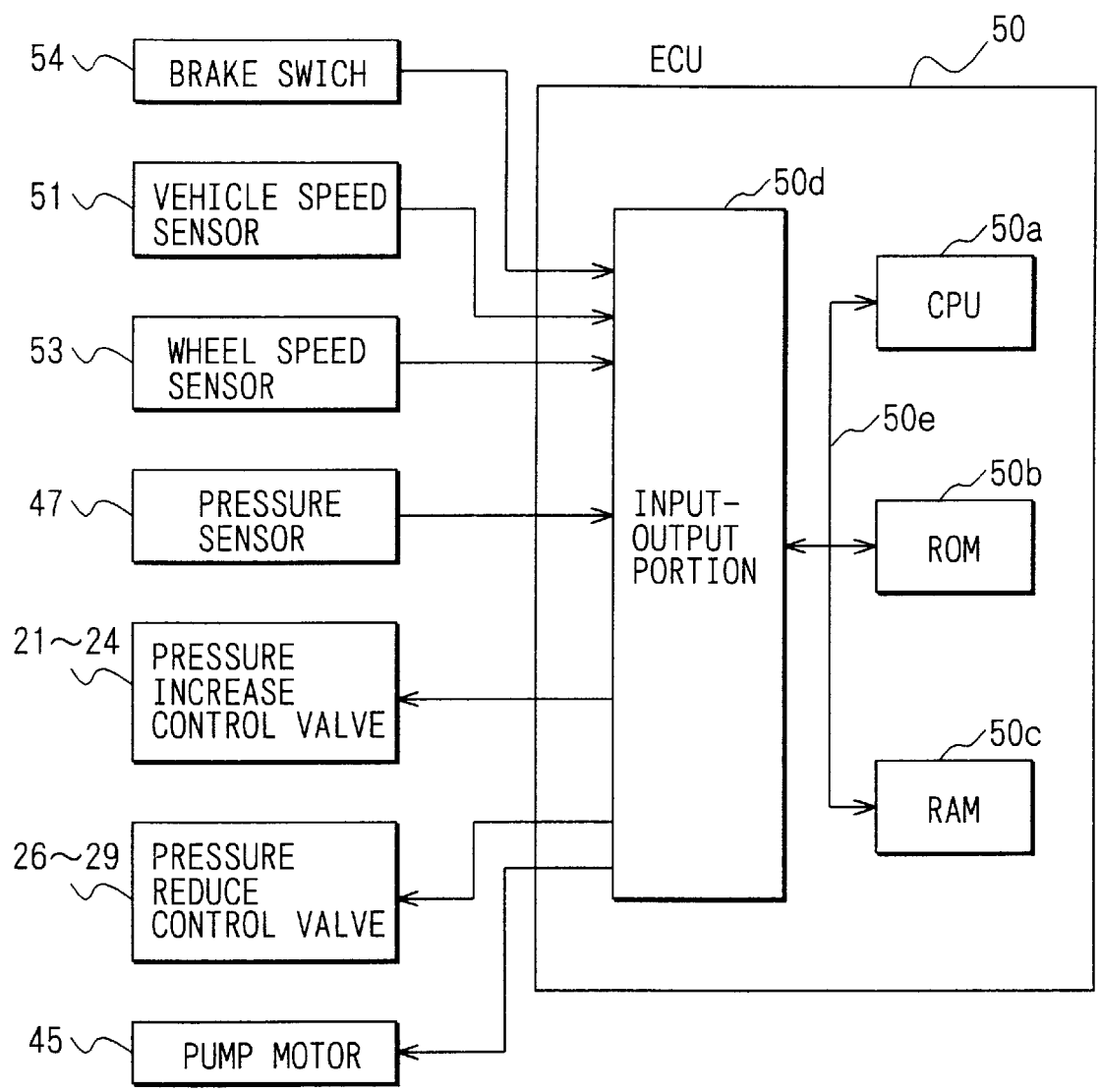
FIG. 2 is a block diagram showing an electric control unit of the brake control device shown in FIG. 1.

ECU 50, as shown in FIG. 2, is provided for controlling the brake control device having the hydraulic circuit 9. The ECU 50 is composed of a microcomputer having well known CPU 50a, ROM 50b, RAM 50c, input-output portions 50d and bath lines 50e. Signals from a vehicle speed sensor 51 for detecting vehicle speed, wheel speed sensors for detecting the respective rotating speeds of wheels, a brake switch 54 for detecting depression of the brake pedal 5 and a pressure sensor 47 for detecting the master cylinder pressure, are input to the ECU 50.

Control signals for driving the electromagnetic valves of the pressure increase and reduce control valves 21 to 24 and 26 to 29 and other actuators such as a control actuator of the pump motor 45 are output from the ECU 50.

Next, an outline of control processes according to the first embodiment is described.

Figure 3:
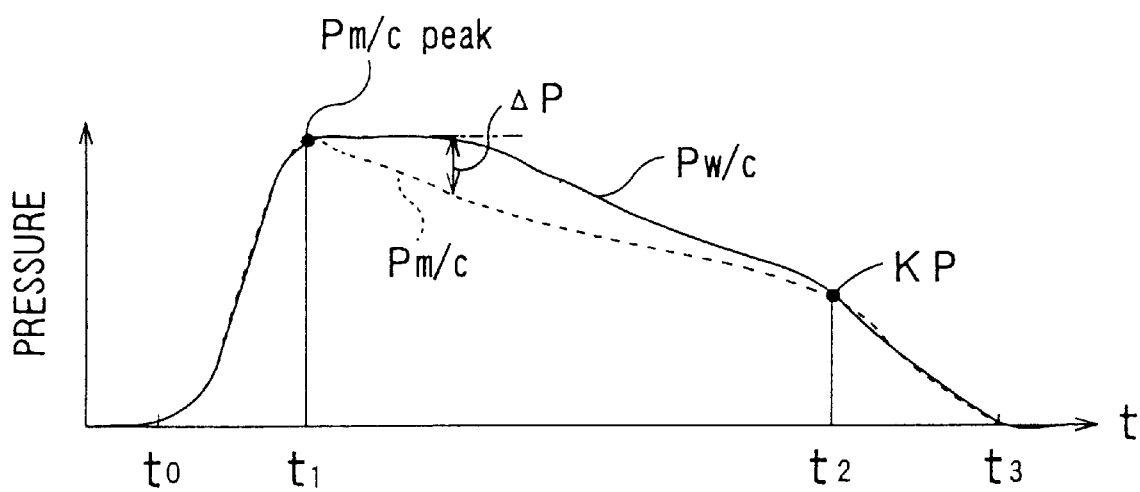
FIG. 3 is a chart showing hydraulic pressure change at sudden braking.

At an initial stage of a sudden braking due to a driver's strong and rapid depression of the brake pedal 5, master cylinder pressure (Pm/c) is rapidly increased so that wheel cylinder pressure (Pw/c) is sharply increased, as shown in a solid line $t_0$ to $t_1$ in FIG. 3. Normally, after the master cylinder pressure reaches a peak value, the master cylinder pressure is gradually reduced as shown in a dotted line $t_1$ to $t_2$ so that braking force may be reduced because a driver foot is too exhausted to continue the strong depression of the brake pedal or leaves the brake pedal by accident due to a strong reaction of the brake pedal and a brake pedal depressing force is reduced.

Therefore, according to the first embodiment, after the brake pedal depressing force attains the peak value, that is, after the master cylinder pressure once reaches a Pm/c peak, the pressure increase control valves 21 to 24 are driven so as to secure a larger hysteresis of hydraulic pressure at a pressure reducing time. As a result, higher pressure in the wheel cylinder is continuously held for a certain time so that higher braking force may be maintained.

Figure 4A:
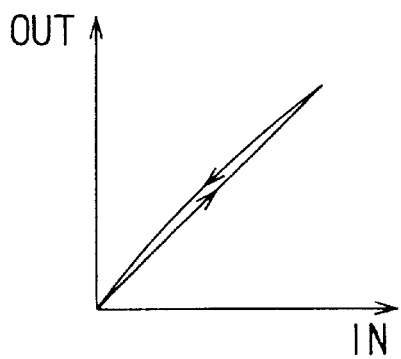
FIG. 4A is a chart showing a linear relationship between pressure on a master cylinder side (IN) and pressure on a wheel cylinder side (OUT)
Figure 4B:
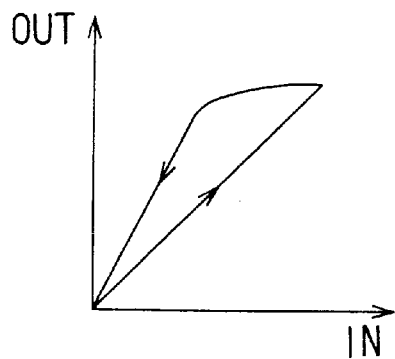
FIG. 4B is a chart showing a relationship with hysteresis between pressure on a master cylinder side (IN) and pressure on a wheel cylinder side (OUT)

Conventionally, pressure between a master cylinder side (IN side) and a wheel cylinder side (OUT side) of each of the pressure increase control valves 21 to 24 are linearly changed both at the pressure increasing and reducing times, as shown in FIG. 4A. However, according to the first embodiment, as shown in FIG. 4B, the pressure changing relationship between the master cylinder and the wheel cylinder is not linear at the pressure reducing time and pressure reduction at the OUT side is delayed from pressure reduction at the IN side with a hysteresis, though the pressure changing relationship is linear at the pressure increasing time.

That is, after the master cylinder pressure attains the peak value due to the sudden braking and, then, starts pressure reduction, each of the pressure increase control valves is driven to gradually open the conduit between the wheel cylinder and the master cylinder without making the hydraulic conduit fully open from a scratch, for example, by duty control of current voltage applied to each of the pressure increase control valves 21 to 24.

Therefore, even if the brake pedal depressing force is lowered after the strong and rapid depression operation of the driver at the initial stage of the sudden braking, higher pressure in the wheel cylinder is continuously held for a certain time so that higher braking force may be maintained.

Next, steps of control processes of the first embodiment are described with reference to flow charts.

Figure 5:
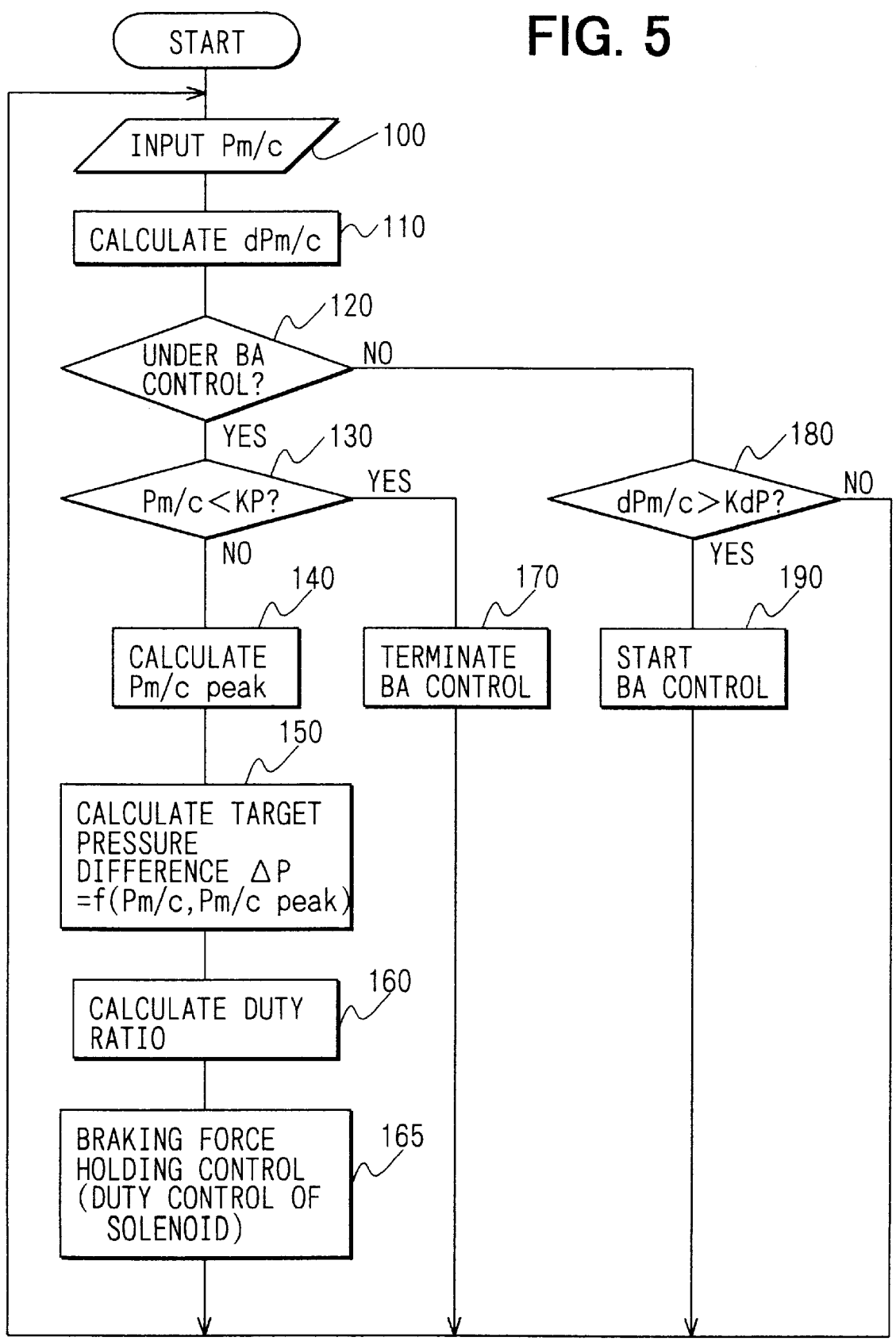
FIG. 5 is a flow chart showing control processes according to the first embodiment.

A flow chart of FIG. 5 shows steps of braking force holding control after the peak of the master cylinder pressure at sudden braking.

During sudden braking, the driver's brake pedal depressing speed is rapid so that wheel cylinder pressure may be rapidly increased at an early stage of the sudden braking (braking force initial control). Further, after the braking force initial control is executed and the master cylinder pressure attains the peak value, the wheel cylinder pressure is controlled to hold a higher braking force for a certain time (braking force holding control), as shown later in detail. For the purpose of the present application, the braking force initial control and the braking force holding control is called a brake assist control.

At Step 100 of FIG. 5, master cylinder pressure (Pm/c) is detected based on a signal of the pressure sensor 47 and recorded or memorized in RAM 50c. At Step 110, a change rate of the master cylinder pressure (d Pm/c) is calculated to judge the sudden braking.

At Step 120, whether the brake assist control (braking force holding control) is executed is determined. If the answer is affirmative, the process goes to Step 130 and, if the answer is negative, the process goes to Step 180.

At the Step 180, whether the change rate of the master cylinder pressure (d Pm/c) exceeds a reference value (KdP) for judging the sudden braking is determined. If the answer is affirmative, the process goes to Step 190 as it is presumed that the sudden braking (an initial stage of brake pedal depressing for the sudden braking) is operated. If the answer is negative, the process returns back to the Step 100 in a presumption that the sudden braking is not operated.

At the Step 190, brake assist control (braking force initial control) starts, if necessary and demanded, by detecting a fact of the early stage of sudden braking. Then, the process returns to the Step 100. The braking force initial control is executed at the early stage of sudden braking in such a manner that high master cylinder pressure is applied via the pressure increase control valves 21 to 24 to the respective wheel cylinders 15 to 18 to rapidly increase the braking force.

At the Step 130 next to the Step 120 at which it is determined that the brake assist control (braking force holding control) is under way, whether the master cylinder pressure (Pm/c) is below a reference value (KP) for judging a termination of the brake assist control is determined. If determined affirmatively, the process goes to Step 170 in a presumption that the brake assist control (including the braking force initial control and the braking force holding control) has terminated. If the answer is negative, the process goes to Step 140 in a presumption that the brake assist control continues.

At the Step 170, a control for terminating the brake assist control is executed and, then, the process returns back to the Step 100. At the Step 170, current supply to solenoids of the pressure increase control valves 21 to 24 are shut off so as to fully open the brake fluid conduit. As a result, wheel cylinder pressure is rapidly lowered to coincide to the master cylinder pressure. In this case, there occurs no hysteresis between changes of the master and wheel cylinder pressure.

At the Step 140, the peak value (Pm/c peak) of master cylinder pressure is calculated as the brake assist control continues. That is, the peak value of master cylinder pressure is calculated based on a detected value of the pressure sensor 47 to find out a point (Pm/c peak in FIG. 3) where master cylinder pressure is changed from an increasing state to a reducing state.

Though master cylinder pressure is rapidly increased at the early stage of sudden braking, as shown in FIG. 3, the master cylinder pressure may be reduced after a lapse of a certain time during which the driver strongly depresses the brake pedal when the driver's brake pedal depressing force is released due to a reaction force of the brake pedal. Accordingly, a peak point of the master cylinder pressure where the increasing state is changed to the reducing state is detected.

Once the peak point of the master cylinder is calculated and memorized, the calculation process at the Step 140 is not always necessary and may be omitted since the memorized value showing the peak point may be utilized for the subsequent calculation of a target pressure difference (this process is also applied to the other embodiments to be described later).

At Step 150, the target pressure difference ΔP is calculated for braking force holding control in which higher wheel cylinder pressure (higher braking force) is held even after master cylinder pressure shows the peak and is reduced. The target pressure difference ΔP is a difference between the peak value (Pm/c peak) and actual master cylinder pressure (pm/c shown in a dotted line of FIG. 3) reducing.

Figure 12:
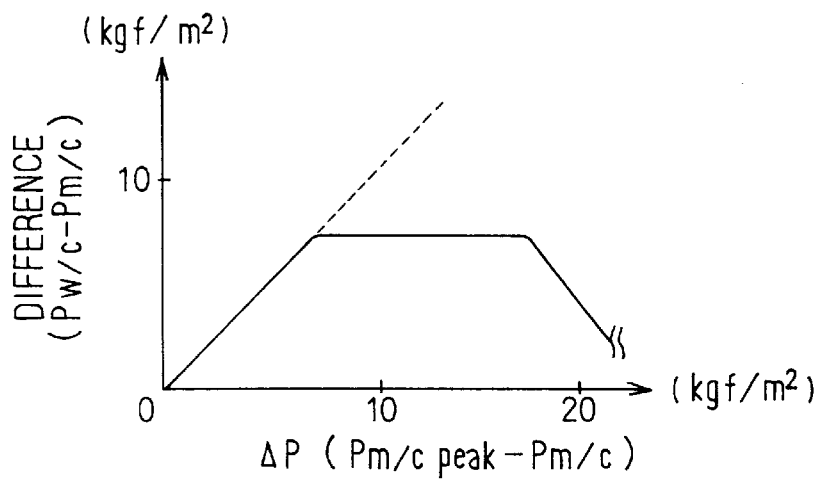
FIG. 12 is a chart showing a relationship between a target pressure difference ΔP and a difference pressure by which wheel cylinder pressure is higher than actual master cylinder pressure Pm/c.

Step 160 is for calculating a duty ratio of current voltage that is applied to the respective solenoids of the pressure increase control valve 21 to 24 for maintaining wheel cylinder pressure higher by a predetermined value to be decided based on the target pressure difference ΔP than actual master cylinder pressure. The predetermined value to be decided based on the target pressure difference ΔP is, for example, as shown in FIG. 12 in which a relationship between the target pressure difference ΔP and the difference pressure by which wheel cylinder pressure is higher than actual master cylinder pressure Pm/c is shown.

Figure 13:
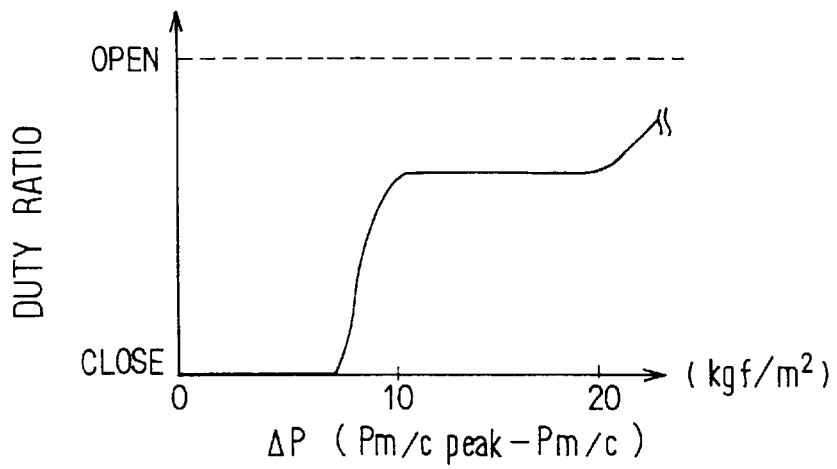
FIG. 13 is a chart showing a relationship between the target pressure difference ΔP and a duty ratio of pressure increase control valve.

A relationship between the target pressure difference ΔP and the duty ratio, for example, as shown in FIG. 13, is memorized in advance in ROM 50b as a map or a calculation formula. Accordingly, the duty ratio corresponding to the target pressure difference ΔP calculated may be obtained with reference to, for example, the map.

At Step 165, braking force holding control is executed by applying current voltage to the solenoids of the pressure increase control valves 21 to 24 so as to realize the duty ratio control mentioned above. Then, the process returns to the Step 100.

As current voltage applied to the solenoids of the pressure increase control valves 21 to 24 is duty controlled, the pressure increase control valves 21 to 24 are not fully opened at once and bring the hysteresis as shown in FIG. 4B. Accordingly, higher wheel cylinder pressure (higher braking force) can be maintained for a necessary period of time as shown in a solid line $t_1$ to $t_2$ of FIG. 3.

According to the first embodiment mentioned above, the brake assist control is executed at sudden braking. When a brake pedal depressing force reduction is detected by the peak value of master cylinder pressure and there is a difference between the value of actual master cylinder pressure and the peak value of master cylinder pressure, which is deemed as a demand of holding braking force, a target value (the target pressure difference ΔP) for executing braking force holding control is calculated.

In braking force holding control, current voltage applied to the solenoids of the pressure increase control valves 21 to 24 is duty controlled based on the target pressure difference representing a difference between the actual master cylinder pressure and the peak value of master cylinder pressure. Even if the brake pedal depressing force is reduced after the peak of master cylinder pressure, higher wheel cylinder pressure can be maintained by the braking force holding control so that higher braking force may be maintained. As a result, safety on the sudden braking may be much more enhanced.

According to the first embodiment, as the necessary braking force at sudden braking is held by the duty control of the pressure increase control valves 21 to 24, the return valves in parallel to the pressure increase control valves 21 to 24 are not provided. Therefore, the hydraulic circuit of the brake control device having less number of components and parts becomes more compact and may be provided at less cost, compared with that of the conventional brake control device.

Though the Steps 100, 110, 120, 130, 170, 180 and 190 are provided for braking force initial control and termination control at sudden braking, a gist of the first embodiment is not limited to the case of sudden braking. Accordingly, the first embodiment may be modified to execute the braking force holding control mentioned above whenever master cylinder pressure shows the peak value P m/c peak. In this case, the Steps 100, 110, 120, 130, 170, 180 and 190 may be omitted.

(Second embodiment)

A brake control device according to a second embodiment is described hereinafter. Explanation of portions similar to those of the first embodiment is omitted or simplified.

The brake control device according to the second embodiment can execute braking force holding control based on a demand of holding braking force when the vehicle is stopped on a sloping road and execute the subsequent braking force termination control.

Figure 6:
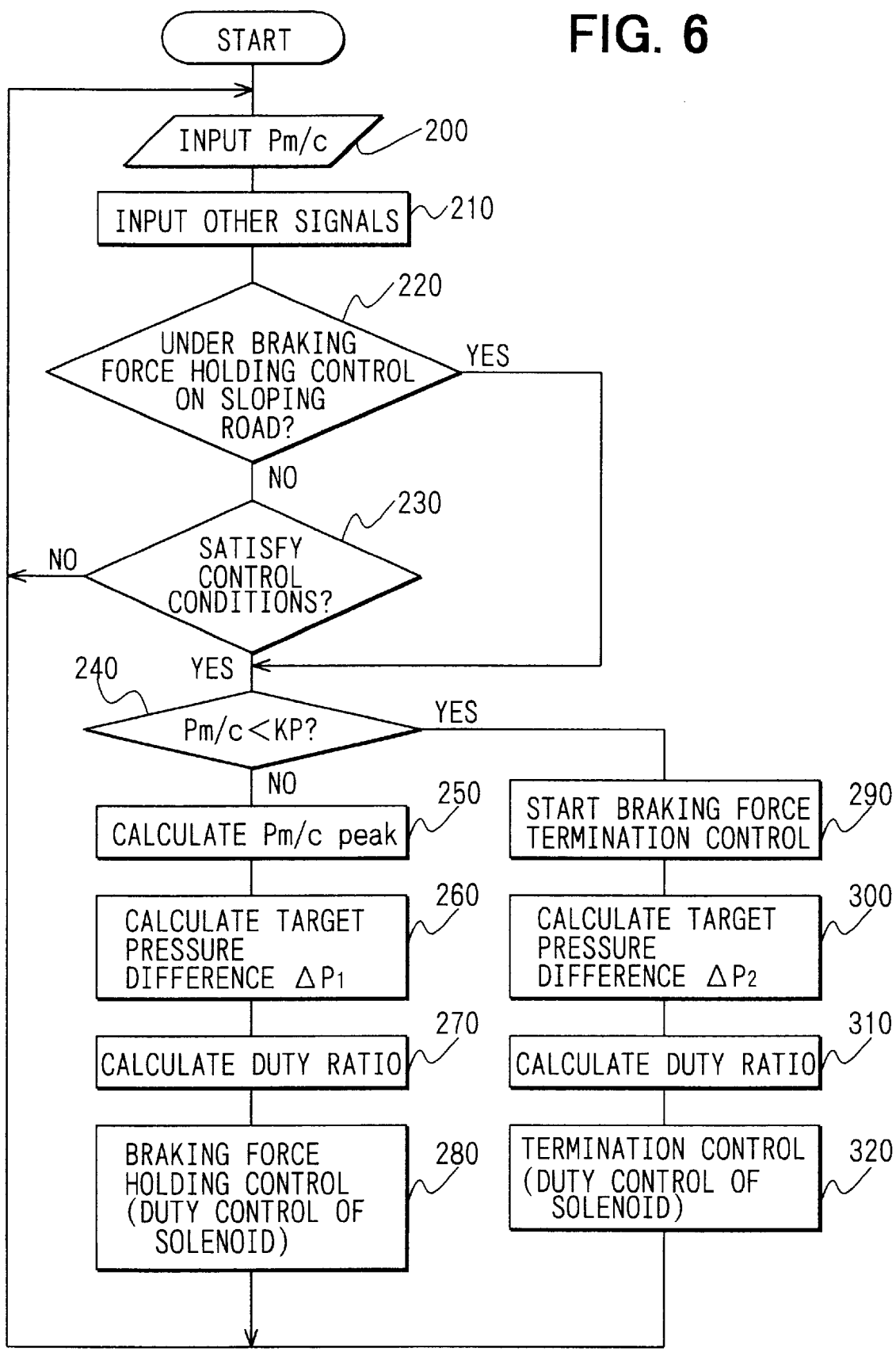
FIG. 6 is a flow chart showing control processes according to a second embodiment of the present invention.

As shown in a flow chart of FIG. 6, at Step 200, master cylinder pressure (pm/c), which is detected based on a signal from the pressure sensor 47, is input.

At Step 210, other signals representing various states and behaviors of vehicle, which are used for determining whether it is appropriate to execute braking force holding control on the sloping road, are input. For example, a signal showing an inclination angle from a slope sensor (not shown) for detecting a state of the sloping road, a signal from the brake switch 54 for detecting the driver's depression of the brake pedal 5, a signal from a vehicle speed sensor 51 (or the wheel speed sensor 53) for detecting vehicle speed (or wheel speed), and so on are all input.

At Step 220, it is determined whether braking force holding control on the sloping road is executed. If the answer is affirmative, the process goes to step 240 and, if negative, the process goes to Step 230.

At the Step 230, whether conditions on executing braking force holding control on the sloping road are satisfied is determined. For example, whether the sloping road has an inclination angle more than a given angle, whether the brake pedal 5 is depressed, and whether the vehicle is in a stopping state (that is, the vehicle or wheel speed is zero) are determined. If the answers are affirmative, the process goes to Step 240 and, if negative, the process returns back to the Step 200.

At the Step 240, whether master cylinder pressure (Pm/c) is below a reference value (KP in FIG. 7) for terminating braking force holding control on the sloping road is determined. The process goes to Step 290, if the answer is affirmative, and to Step 250, if the answer is negative.

Figure 7:
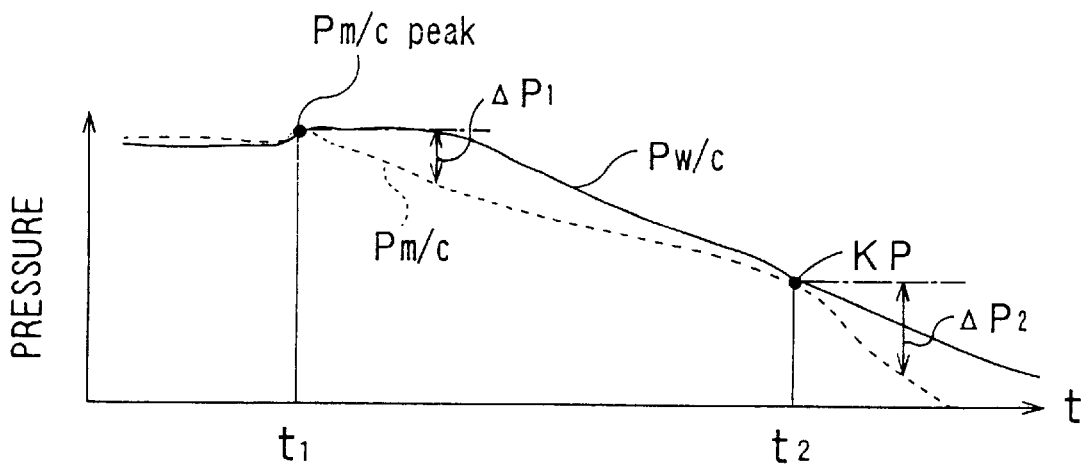
FIG. 7 is a chart showing hydraulic change at a vehicle stop on a sloping load.

At the Step 250, a peak value (Pm/c peak) of master cylinder pressure as shown in FIG. 7, which is similar to that of the first embodiment, is calculated and memorized. In this case, when brake pedal depressing force is eased after the vehicle is stopped, there exists the peak of master cylinder pressure. The peak value is used for this control.

At Step 260, a target pressure difference ΔP1 is calculated. To execute braking force holding control for holding higher wheel cylinder pressure (braking force) even after the peak of master cylinder pressure when the vehicle is stopped on the sloping road, a difference between the peak value (Pm/c peak) of master cylinder pressure and an actual value (Pm/c) of master cylinder pressure reducing is calculated as the target pressure difference ΔP1.

At Step 270, a duty ratio of current voltage that is applied to the respective solenoids of the pressure increase control valves 21 to 24 is calculated according to a map or a calculation formula based on the target pressure difference ΔP1.

At Step 280, braking force holding control is executed by applying current voltage to the solenoids of the pressure increase control valves 21 to 24 and, then, the process returns to the Step 200.

As the negative answer at the Step 240 means a termination time of braking force holding control on the sloping road, control necessary for terminating the braking force holding control is executed at Step 290. This termination control is not for fully opening the pressure increase control valves 21 to 24 as shown in the first embodiment, but for executing control similar to braking force holding control on the sloping road mentioned above.

That is, as shown in a dotted line within a scope on a right side of $t_2$ of FIG. 7, master cylinder pressure is sharply lowered when the brake pedal 5 is returned. However, according to the termination control mentioned above, wheel cylinder pressure is gradually reduced with a given slope as shown in a solid line within a scope on a right side of $t_2$ of FIG. 7 to cope with a demand of further holding hydraulic pressure due to the driver's resetting the brake pedal depression the subsequent accelerator pedal depression.

For this purpose, at Step 300, a target pressure difference ΔP2 for braking force termination control is calculated. That is, to execute braking force termination control in which wheel cylinder pressure(braking force)is maintained with a given slope, a difference between the reference master cylinder pressure (KP) and an actual master cylinder pressure sharply lowering is calculated as the target pressure difference ΔP2.

Figure 14:
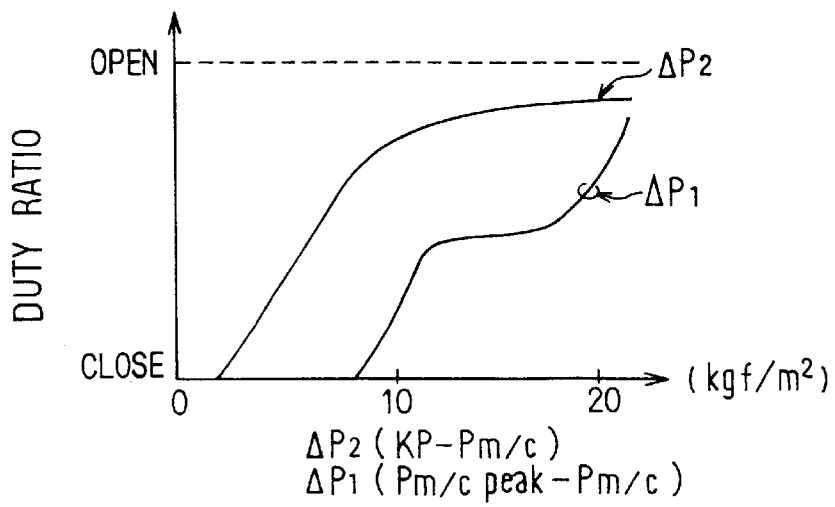
FIG. 14 is a chart showing a relationship between a target pressure difference ΔP1 or ΔP2 and a duty ratio of pressure increase control valve.
Figure 15:
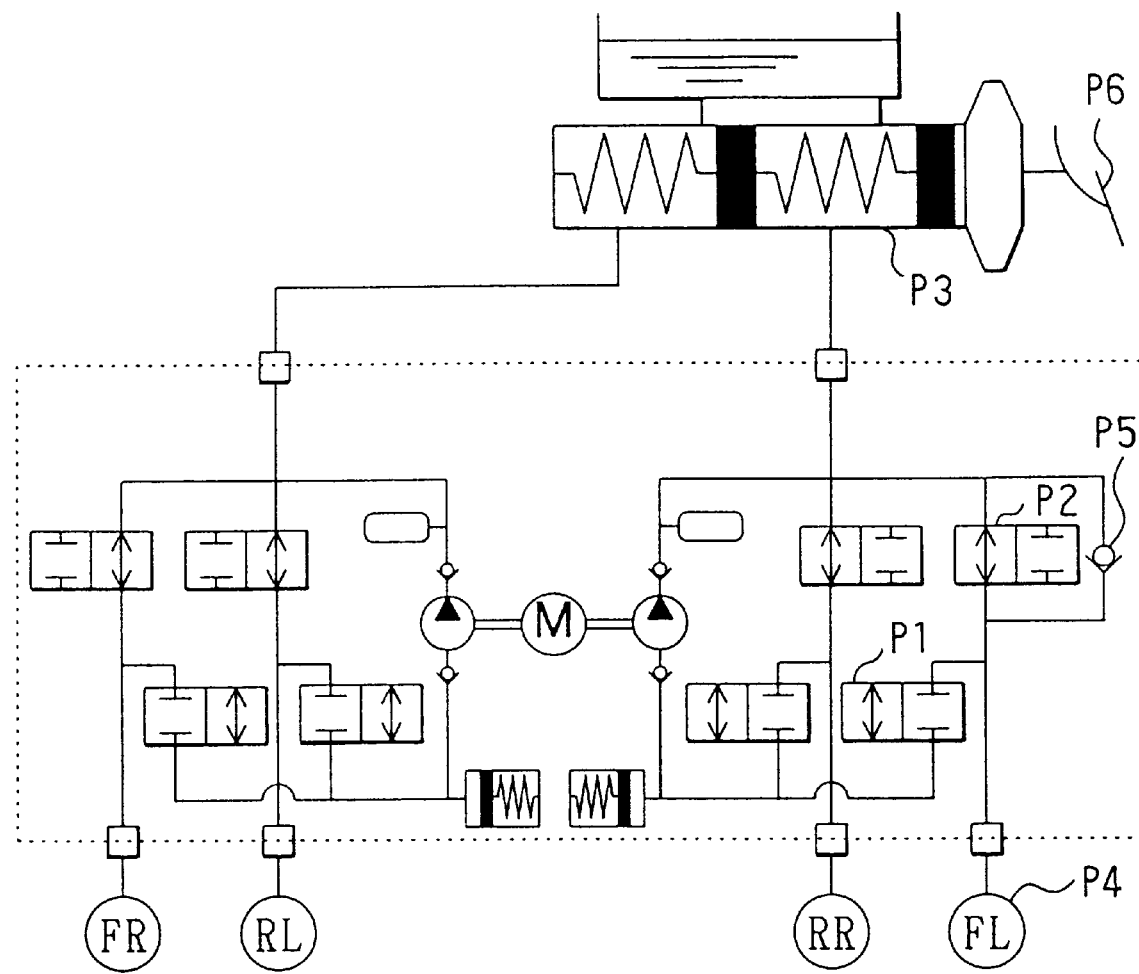
FIG. 15 is a view showing an outline of a conventional brake control device as a prior art.

A chart comparing a relationship between a target pressure difference ΔP2 and a duty ratio of pressure increase control valve with a relationship between a target pressure difference ΔP1 and a duty ratio of pressure increase control valve is shown in FIG. 14. According to this chart, the duty ratio corresponding to the target pressure difference ΔP2 is set so as to make the pressure increase control valve more open so that pressure difference between wheel cylinder pressure (Pw/c) and master cylinder pressure (Pm/c) is smaller, compared to the duty ratio corresponding to the target pressure difference ΔP1.

At Step 310, a duty ratio of current voltage that is applied to the respective solenoids of the pressure increase control valve 21 to 24 is calculated according to a map or a calculation formula based on the target pressure difference ΔP2.

At Step 320, current voltage, which can realize the duty ratio mentioned above, is applied to the solenoids of the pressure increase control valves 21 to 24 to execute braking force termination control and, then, the process returns to the step 200.

According to the second embodiment, when the vehicle is stopped on the sloping road, higher wheel cylinder pressure may be held to maintain the stopping state of the vehicle. Therefore, even when the driver's brake pedal depressing force is lowered, the stopping state of the vehicle on the sloping road can be surely maintained.

Further, when the driver once releases the brake pedal 5 for resetting the brake pedal depressing operation for the subsequent operation, wheel cylinder pressure is not lowered rapidly as is in the conventional brake control device, but gradually reduced by braking force termination control. As a result, the vehicle may maintain the stopping state on the sloping road even if the brake pedal is once returned for resetting so that driving safety on the sloping road may be improved.

(Third embodiment)

A brake control device according to a third embodiment is described hereinafter. Explanation of portions similar to those of the first embodiment is omitted or simplified.

The brake control device according to the third embodiment can execute braking force holding control based on a demand of holding braking force at an idle stop and the subsequent braking force termination control.

Figure 8:
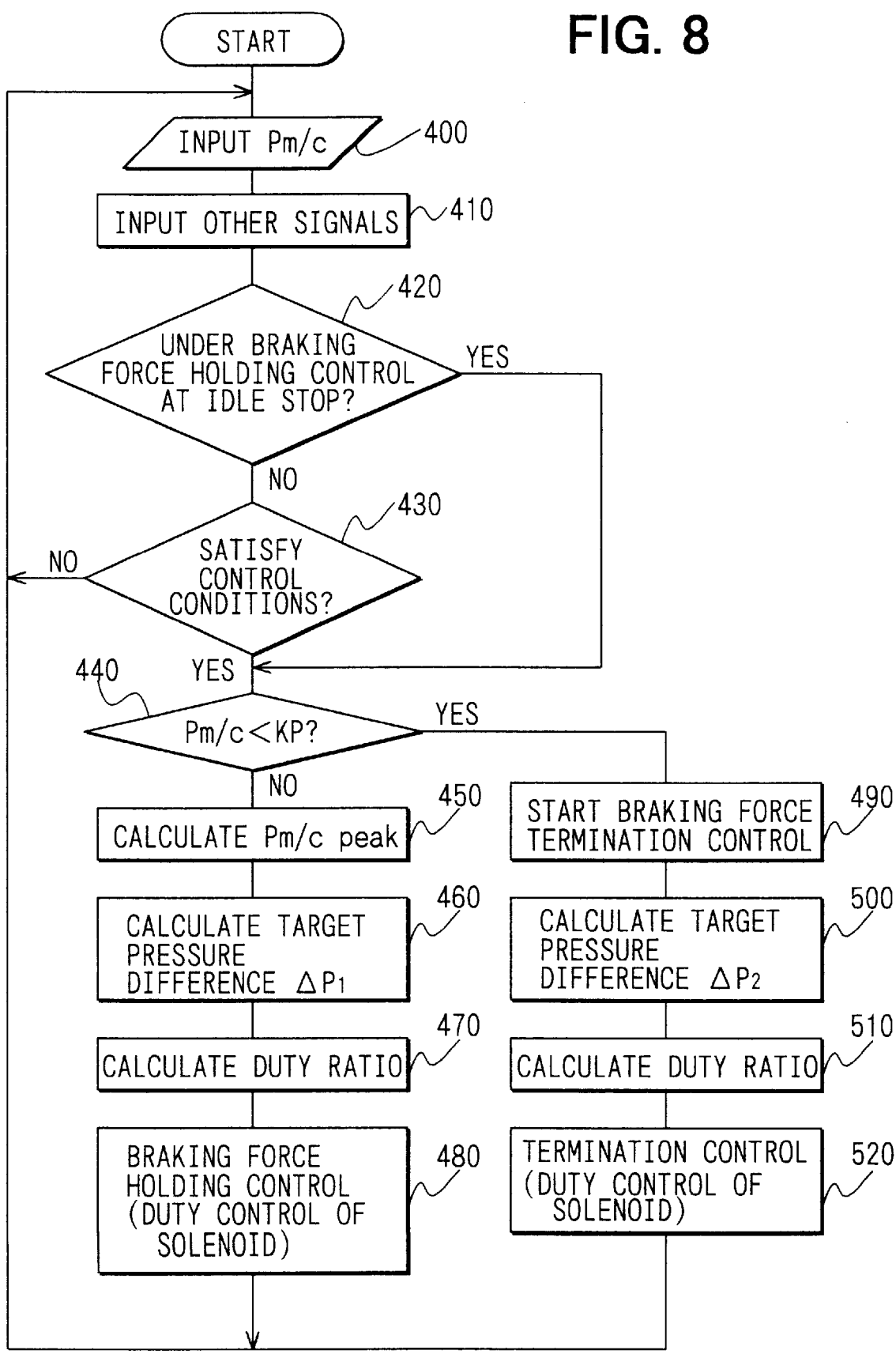
FIG. 8 is a flow chart showing control processes according to a third embodiment of the present invention.

As shown in a flow chart of FIG. 8, at Step 400, master cylinder pressure (pm/c), which is detected based on a signal from the pressure sensor 47, is input.

At Step 410, other signals representing various states and behaviors of vehicle, which are used for determining whether it is appropriate to execute braking force holding control at the idle stop, are input. For example, a signal showing an engine revolution sensor (not shown) for detecting the engine stop (or a signal showing fuel cut or ignition stop), a signal from the brake switch 54 for detecting the driver's depression of the brake pedal 5, a signal from a vehicle speed sensor 51 (or the wheel speed sensor 53) for detecting vehicle speed (or wheel speed), and so on are all input.

At Step 420, it is determined whether braking force holding control at the idle stop is executed. If the answer is affirmative, the process goes to Step 440 and, if negative, the process goes to step 430.

At the Step 430, whether conditions on executing braking force holding control at the idle stop are satisfied is determined. For example, whether the engine is in an idling state, whether the brake pedal 5 is depressed, and whether the vehicle is in a stopping state (that is, the vehicle or wheel speed is zero) are determined. If the answers are affirmative (at a time $t_1$ of FIG. 9), the process goes to Step 440 and, if negative, the process returns back to the Step 400.

At the Step 440, whether master cylinder pressure (Pm/c) is below a reference value (KP in FIG. 9) for terminating braking force holding control at the idle stop is determined. The process goes to Step 490, if the answer is affirmative, and to Step 450, if the answer is negative.

Figure 9:
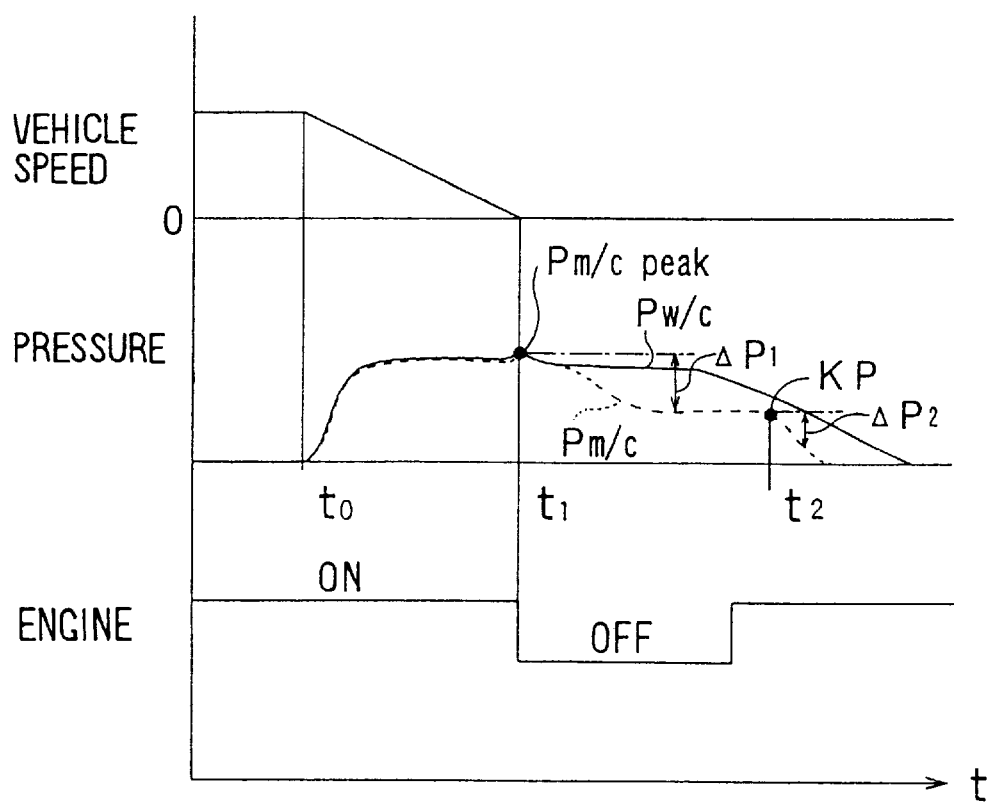
FIG. 9 is a chart showing hydraulic change at an idle stop.

At the Step 450, a peak value (Pm/c peak) of master cylinder pressure as shown in FIG. 9, which is similar to those of the first and second embodiments, is calculated. At the idle stop, a boosting operation of the booster is adversely affected since the engine stops and intake manifold negative pressure is cancelled. As a result, driver's brake pedal depression is released so that there exists the peak of master cylinder pressure. The peak value is used for this control.

At Step 460, a target pressure difference ΔP1 is calculated. To execute braking force holding control for holding higher wheel cylinder pressure (braking force) even after the peak of master cylinder pressure when the vehicle is stopped at the idle stop, a difference between the peak value (Pm/c peak) of master cylinder pressure and an actual value (Pm/c) of master cylinder pressure reducing is calculated as the target pressure difference ΔP1.

At Step 470, a duty ratio of current voltage that is applied to the respective solenoids of the pressure increase control valves 21 to 24 is calculated according to a map or a calculation formula based on the target pressure difference ΔP1.

At Step 480, braking force holding control is executed by applying current voltage to the solenoids of the pressure increase control valves 21 to 24 and, then, the process returns to the Step 200.

As the negative answer at the Step 440 means a termination time (a time $t_2$ of FIG. 9) of braking force holding control at the idle stop, control necessary for terminating the braking force holding control is executed at Step 490. This termination control is not for fully opening the pressure increase control valves 21 to 24 as shown in the first embodiment, but for executing control similar to braking force holding control at the idle stop mentioned above.

That is, as shown in a dotted line within a scope on a right side of $t_2$ of FIG. 9, master cylinder pressure is sharply lowered when the brake pedal 5 is returned. However, according to the termination control mentioned above, wheel cylinder pressure is gradually reduced with a given slope as shown in a solid line within a scope on a right side of $t_2$ of FIG. 7 to cope with a demand of holding hydraulic pressure due to the driver's resetting the brake pedal depression for the subsequent accelerator depression.

For this purpose, at Step 500, a target pressure difference ΔP2 for braking force termination control is calculated. That is, to execute braking force termination control in which wheel cylinder pressure (braking force) is maintained with a given slope, a difference between the reference master cylinder pressure (KP) and an actual master cylinder pressure sharply lowering is calculated as the target pressure difference ΔP2.

At Step 510, a duty ratio of current voltage that is applied to the respective solenoids of the pressure increase control valve 21 to 24 is calculated according to a map or a calculation formula based on the target pressure difference ΔP2.

At Step 520, current voltage, which can realize the duty ratio mentioned above, is applied to the solenoids of the pressure increase control valves 21 to 24 to execute braking force termination control and, then, the process returns to the step 400.

According to the third embodiment, when the vehicle is stopped at the idle stop, higher wheel cylinder pressure may be held to maintain the stopping state of the vehicle. Therefore, even when the driver's brake pedal depressing force is lowered, the stopping state of the vehicle at the idle stop can be surely maintained.

In particular, as brake hydraulic pressure cannot be sufficiently multiplied by the brake booster at the idle stop since the engine is stopped, brake pedal is likely returned by the reaction force from the brake pedal when the engine is stopped. In this case, the pressure increase control valves 21 to 24 serves to hold wheel cylinder pressure sufficiently so that higher braking force may be secured.

Further, when the driver once releases the brake pedal 5 for resetting the brake pedal depressing operation, wheel cylinder pressure is not lowered rapidly as is in the conventional brake control device, but gradually reduced by braking force termination control. As a result, the vehicle may maintain the stopping state at the idle stop even if the brake pedal is once returned for resetting so that driving safety at the idle stop may be improved.

(Fourth embodiment)

A brake control device according to a fourth embodiment is described hereinafter. Explanation of portions similar to those of the first embodiment is omitted or simplified.

Figure 10:
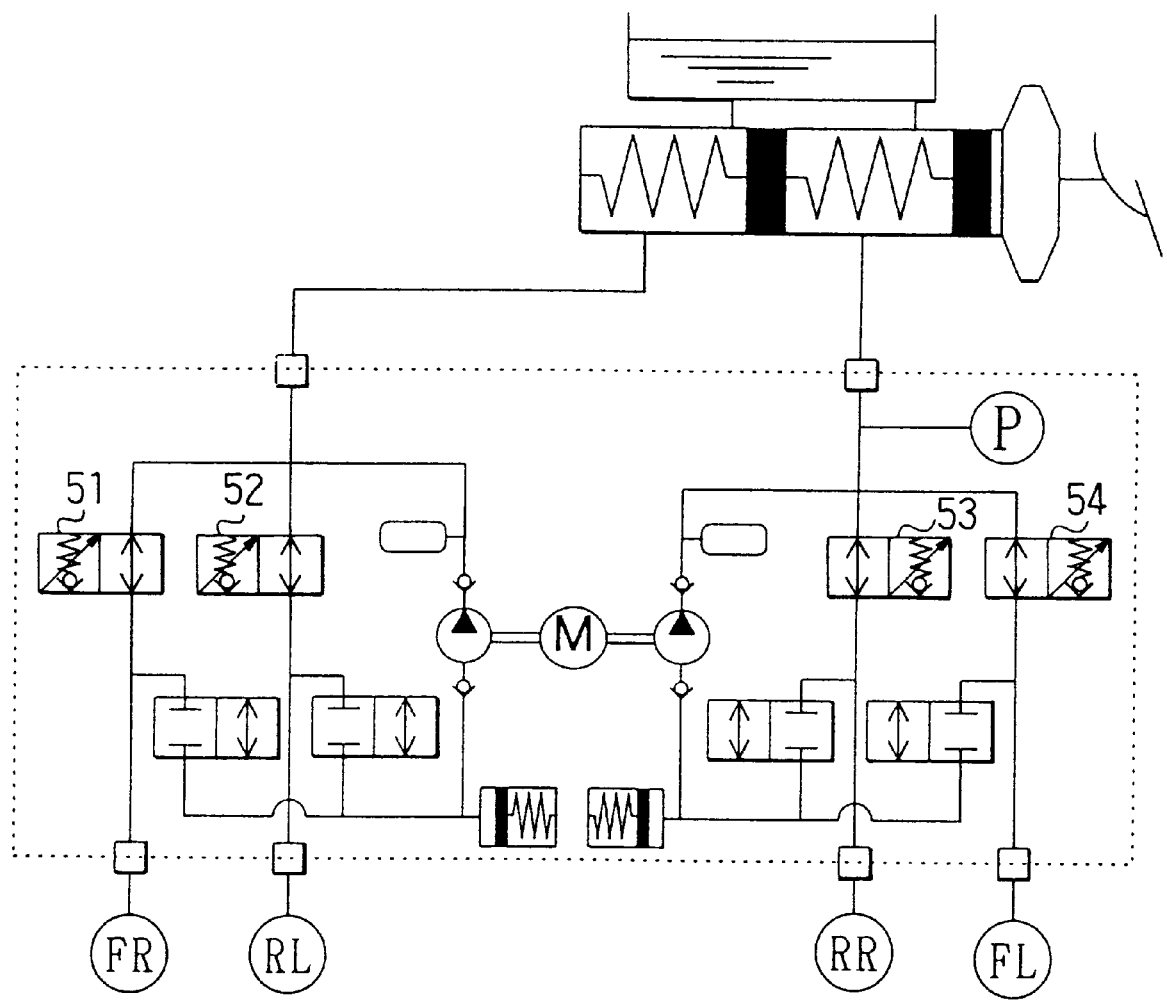
FIG. 10 is a view showing an outline of a brake control device according to a fourth embodiment of the present invention.

A brake control device according to the fourth embodiment has a hydraulic circuit whose construction is a little different from that of the first embodiment. As shown in FIG. 10, pressure increase control valves 51 to 54 are linear solenoid valves whose each valve opening degree is changed in proportion to a current amount to be supplied to each of the solenoids. When the solenoids of the pressure increase control valves 51 to 54 are not energized by current, the valves are operative to open the fluid conduit by their own spring force and, when the solenoids are energized, to close the fluid conduit in proportion to the current amount supplied thereto. Therefore, after wheel cylinder pressure is increased by master cylinder pressure, wheel cylinder pressure may be adequately held by controlling the current amount supplied to the solenoids of the pressure increase control valves 51 to 54.

Control processes of the braking force initial control and the subsequent braking force holding control according to the fourth embodiment are nearly same as those of the first embodiment.

Figure 11:
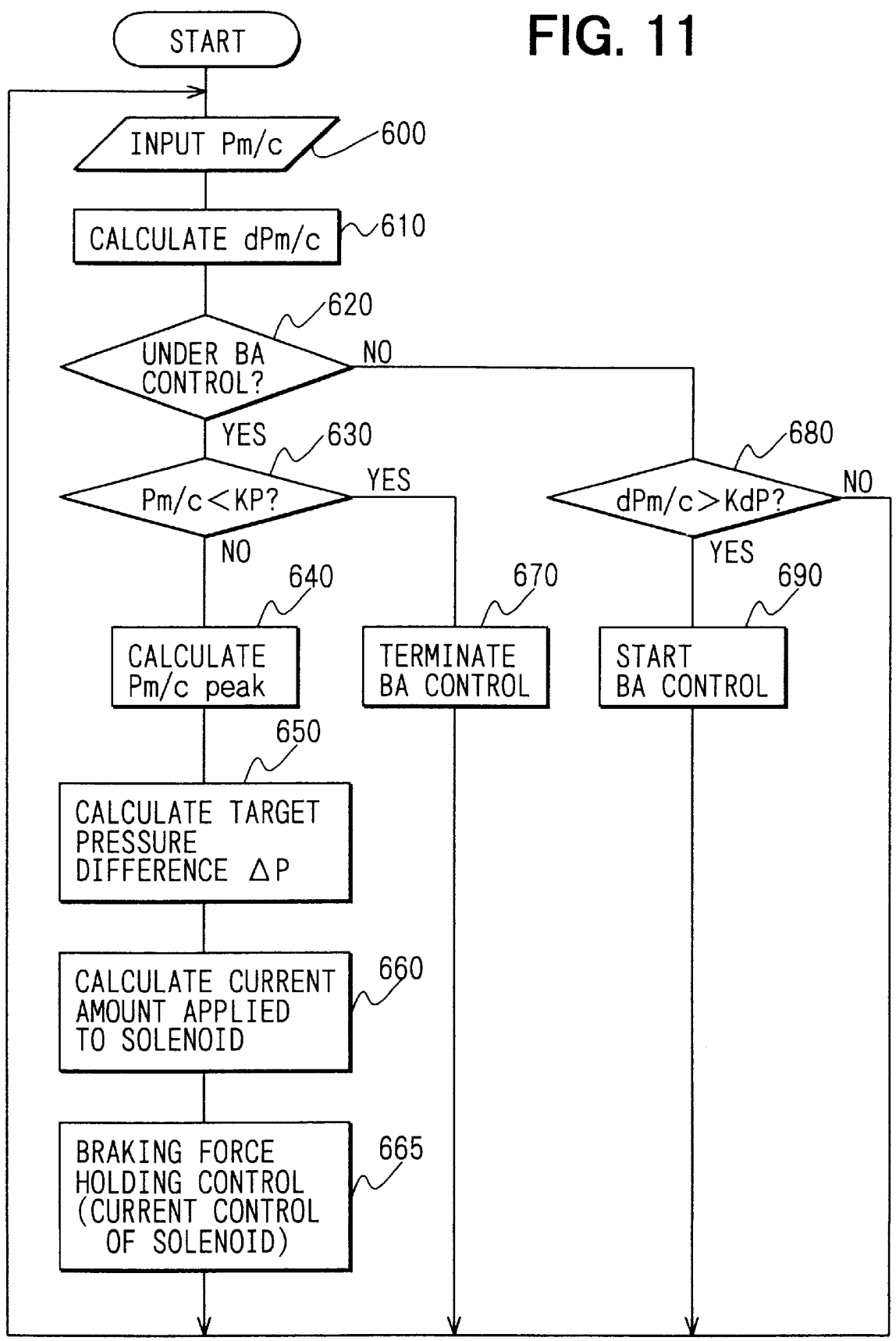
FIG. 11 is a flow chart showing control processes according to the fourth embodiment.

As shown in FIG. 11, at Step 600, master cylinder pressure (Pm/c) detected based on a signal of the pressure sensor 47 is input. At Step 610, a change rate of the master cylinder pressure (d Pm/c) is calculated to judge the sudden braking.

At Step 620, whether the brake assist control is executed is determined. If the answer is affirmative, the process goes to Step 630 and, if the answer is negative, the process goes to Step 680.

At the Step 680, whether the change rate of the master cylinder pressure (d Pm/c) exceeds a reference value (KdP) for judging the sudden braking is determined. If the answer is affirmative, the process goes to Step 690 as it is presumed that the sudden braking (an initial stage of brake pedal depressing for the sudden braking) is operated. If the answer is negative, the process returns back to the Step 600 in a presumption that the sudden braking is not operated.

At the Step 690, brake assist control (braking force initial control) starts, if necessary, according to the demand because of the early stage of sudden braking. Then, the process returns to the Step 600.

At the Step 690, brake assist control (braking force initial control) starts, if necessary and demanded, by detecting a fact of the early stage of sudden braking. Then, the process returns to the Step 600. At the Step 630 next to the Step 620 at which it is determined that the brake assist control is under way, whether the master cylinder pressure (Pm/c) is below a reference value (KP) for judging a termination of the brake assist control is determined. If determined affirmatively, the process goes to Step 670 in a presumption that the brake assist control (including the braking force initial control and the braking force holding control) has terminated. If the answer is negative, the process goes to Step 640 in a presumption that the brake assist control continues.

At the Step 670, a control for terminating the brake assist control is executed and, then, the process returns back to the Step 600. At the Step 670, the current amount supplied to the solenoids of the pressure increase control valves 51 to 54 becomes zero [0] so as to fully open the brake fluid conduit.

At the Step 640, a peak value (Pm/c peak) of master cylinder pressure is calculated. At Step 650, a target pressure difference ΔP, which is a difference between the peak value (Pm/c peak) of master cylinder pressure and actual master cylinder pressure (Pm/c) gradually reducing, is calculated.

At Step 660, the current amount applied to the respective solenoids of the pressure increase control valve 51 to 54 for maintaining wheel cylinder pressure higher by the target pressure difference ΔP than actual master cylinder pressure is calculated.

A relationship between the target pressure difference ΔP and the current amount is memorized in advance in ROM 50b as a map or a calculation formula. Accordingly, the current amount corresponding to the target pressure difference ΔP calculated may be obtained with reference to, for example, the map.

At Step 665, braking force holding control is executed by applying the current amount to the solenoids of the pressure increase control valves 51 to 54. Then, the process returns to the Step 600.

According to the fourth embodiment, as mentioned above, the current amount supplied to the solenoids of pressure increase control valves 51 to 54 is controlled for executing braking force holding control so that a difference between master cylinder pressure and wheel cylinder pressure may correspond to the target pressure difference ΔP.

Even if the brake pedal depressing force is reduced after the peak of master cylinder pressure, higher wheel cylinder pressure can be maintained by the braking force holding control so that higher braking force may be maintained. As a result, safety on the sudden braking may be much more enhanced similarly as mentioned in the first embodiment.

According to the fourth embodiment, as the necessary braking force at sudden braking is held by controlling the current amount for the pressure increase control valves 51 to 54, the return valves in parallel to the pressure increase control valves 51 to 54 are not provided. Therefore, the hydraulic circuit of the brake control device having less number of components and parts becomes more compact and may be provided at less cost, compared with that of the conventional brake control device.

Further, in the case of the first or fourth embodiment, the braking force termination control may be executed after braking force holding control. To the contrary, in the case of the second and third embodiments, braking force termination control may be omitted and only braking force holding control is executed.

Furthermore, as a recording medium for recording processes, programs or memories for executing the control mentioned above, not only ECU composed of the microcomputer but also a microchip, a floppy disk, a hard disk and an optical disk may be used.

Moreover, for calculating the target pressure difference ΔP in the first to fourth embodiments, driver's brake pedal depressing force may be detected and the detected depressing force may be used as a replacement of master cylinder pressure. In this case, instead of the peak value Pm/c peak of master cylinder pressure and the actual value of the master cylinder pressure (pm/c) reducing, a peak value of the depressing force and an actual value of the depressing force reducing may be used. And, the calculated target pressure difference based on the Driver's brake pedal depressing force may be used for duty ratio control or current amount control of the pressure increase control valve.

What is claimed is:

1. A brake control device for vehicle comprising:

brake pressure producing means for producing hydraulic pressure in response to a driver's brake pedal operation;

a fluid conduit whose one end is connected with the brake pressure producing means;

a solenoid valve disposed in the fluid conduit so that the fluid conduit may be provided on a side of the brake pressure producing means with a first hydraulic pressure and on a side opposite to the brake pressure producing means with a second hydraulic pressure;

braking force generating means connected with another end of the fluid conduit for generating braking force upon receipt of the second hydraulic pressure so that brake fluid may be communicated via the solenoid valve between the brake pressure producing means and the braking force generating means;

a pressure sensor for generating a signal representing a value corresponding to driver's brake pedal depressing force;

memory means for receiving the pressure sensor signal and memorizing a peak value thereof;

calculating means connected in circuit with the pressure sensor and the memory means for calculating a control amount based on a difference between the peak value of the pressure sensor signal and an actual value of the pressure sensor signal to be lowered when the brake pedal is returned; and driving means connected in circuit with the solenoid valve and the calculating means for driving the solenoid valve so as to restrict brake fluid flow from the braking force generating means to the brake pressure producing means in response to the control amount, wherein, a braking force holding control is executed in such a way that, while an increasing speed of the second hydraulic pressure is substantially equal to that of the first hydraulic pressure when the brake pedal is depressed, a reducing speed of the second hydraulic pressure is lower than that of the first hydraulic pressure during a given period when the brake pedal happens to be returned.

2. A brake control device according to claim 1, further comprising:

sensor means for detecting and generating sensor signals representing vehicle states; and determining means connected in circuit with the sensor means for determining from the sensor signals a necessity of the braking force holding control and generating a demand s signal, wherein the braking force holding control is executed when the demand signal is generated.

3. A brake control device according to claim 2, wherein the determining means generates the demand signal by determining based on at least one of the sensor signals that a change per time of the brake pedal movement exceeds a predetermined value.

4. A brake control device according to claim 2, wherein the determining means generates the demand signal by determining based on the sensor signals that the vehicle stops on a sloping road due to the driver's brake pedal operation.

5. A brake control device according to claim 4, wherein the sensor signals comprises signals from a sloping sensor for detecting an inclination angle of the vehicle stopping on the sloping road, from a brake switch for detecting the driver's brake pedal depression and from a speed sensor for detecting at least one of a vehicle speed and a wheel speed.

6. A brake control device according to claim 4, wherein the sensor signals comprises signals from a sensor for detecting an engine stop, from a brake switch for detecting the driver's brake pedal depression and from a speed sensor for detecting at least one of a vehicle speed and a wheel speed.

7. A brake control device according to claim 2, wherein the determining means generates the demand signal by determining based on the sensor signals that an engine of the vehicle stops as an idle stop due to the driver's brake pedal operation.

8. A brake control device according to claim 1, wherein the pressure sensor is a sensor for detecting the first hydraulic pressure.

9. A brake control device according to claim 8, further comprising:

termination determining means for determining an termination of the braking force holding control by detecting that a value of the first hydraulic pressure is below a predetermined value and generating a termination signal so that the driving means may stop driving the solenoid valve.

10. A brake control device according to claim 8, further comprising:

termination determining means for determining an termination of the braking force holding control by detecting that a value of the first hydraulic pressure is below a predetermined value and generating a termination signal;

termination calculating means connected in circuit with the pressure sensor and the termination determining means for calculating a termination control amount based on a difference between the reference value and the actual value of the first hydraulic pressure to be lowered when the brake pedal is still at a return stroke; and termination driving means connected in circuit with the solenoid valve and the termination calculating means for driving the solenoid valve in response to the termination control amount when the termination signal is generated so that a reducing speed of the second hydraulic pressure is lower than that of the first hydraulic pressure.

11. A brake control device according to claim 1, wherein the solenoid valve is a two position valve driven by the driving means so that current voltage applied thereto is duty controlled according to the control amount.

12. A brake control device according to claim 1, wherein the solenoid valve is a linear solenoid valve driven by the driving means so that a current amount applied thereto is controlled according to the control amount.

13. The brake control device according to claim 1, wherein a wheel cylinder pressure is released by an opening and closing state of the solenoid valve.

14. The brake control device according to claim 1, wherein the solenoid valve is driven so as to secure a larger hysteresis of hydraulic pressure at a pressure reducing time.

15. The brake control device according to claim 14, wherein the braking force generating means comprises wheel cylinders, and a higher pressure in the wheel cylinders is continuously held for a limited time period.

* * * * *